United States Patent [19]

Mack

[11] 3,888,429

[45] June 10, 1975

[54] ENDLESS LOOP MAGNETIC TAPE CARTRIDGE WITH REMOVABLE TAPE GUIDE INSERT

[76] Inventor: Bernard Mack, 1750 N.E. 191 St., North Miami Beach, Fla. 33162

[22] Filed: July 20, 1973

[21] Appl. No.: 381,010

[52] U.S. Cl. .......................... 242/55.19 A; 226/196
[51] Int. Cl. ............................................ B65h 17/48
[58] Field of Search ............ 242/55.19 A, 197, 198, 242/199, 200, 76; 179/100.2 Z; 274/4 B; 226/196; 360/93

[56] References Cited

UNITED STATES PATENTS

| | | | |
|---|---|---|---|
| 3,642,220 | 2/1972 | Merry | 242/55.19 A |
| 3,677,628 | 7/1972 | Walker | 242/55.19 A X |
| R27,584 | 2/1973 | Cousino | 242/55.19 A |

*Primary Examiner*—Billy S. Taylor
*Attorney, Agent, or Firm*—Ernest H. Schmidt

[57] ABSTRACT

A tape guide insert for 8-track endless loop magnetic tape cartridges, and which replaces the foam pads and pressure roller heretofore incorporated in such cartridges, is described. The insert is integrally formed of a tough, resilient, synthetic plastic material having a low coefficient of friction and providing slide surfaces for guidingly supporting the tape in its travel across the face of its cartridge while at the same time providing resilient backing for the tape at zones whereat the sensing switch, transducer head and drive capstan are applied during use of the tape in association with recording and/or playback equipment. The removability of the insert allows for pre-assembly thereto of the tape, thereby simplifying splicing of the tape and its assembly to the cartridge in production.

4 Claims, 5 Drawing Figures

ENDLESS LOOP MAGNETIC TAPE CARTRIDGE WITH REMOVABLE TAPE GUIDE INSERT

This invention relates to standard so-called 8-track endless loop magnetic tape cartridges of a type commonly used for recording and playback of music and the human voice, and is directed particularly to improvements in the tape guide mechanism by means of which the tape is supported at the open end or face of the cartridge for cooperative engagement with the recording, reproducing and erasing heads and the capstan associated with recording and playback equipment using such cartridges.

Heretofore the cartridge housing of 8-track or type III endless loop magnetic tape cartridge has been such that the mechanism for supporting and guiding the tape across the face of the housing was an integral part thereof so that when the two half shell parts of the housing were assembled to the tape reel, the free loop of the tape became captured for guidance behind the cartridge face openings through which the equipment transducer head and tape drive mechanism operated. With such unitary construction of the housing and its associated tape support and guide mechanism, the threading of the open loop of the tape reel upon assembly of the cartridge is a tedious and time-consuming operation. Moreover, prior to assembly of the tape reel to the cartridge housing the free ends of the tape have heretofore been spliced together on a separate fixture designed for this purpose, a procedure requiring additional time-consuming handling and adjustment of the cartridge reel.

It is, accordingly, the principal object of this invention to obviate the above-described deficiencies of presently existing endless loop magnetic tape cartridges by the provision of a tape guide insert through which the loop of a cartridge tape reel can readily be inserted prior to assembly to the cartridge housing, and which at the same time serves as a fixture for splicing the endless loop of the tape, whereby greater accuracy in splicing as well as a substantial saving in tape loading time is effected.

Another object of the invention is to provide a cartridge case or housing for endless loop magnetic tape cartridges of the character described wherein, by virtue of making the mechanism for supporting and guiding the tape across the face of the case a separate device readily insertable at the time of assembly thereto of the tape reel in substitution for the foam pads, rollers etc. heretofore provided, substantial reduction of the cost of the case is effected. Thus, not only is less material required in the fabrication of the cartridge case, but its simplification permits molding at a faster cycle and obviates several assembly operations involving mechanism the function of which is effected, in a simplified manner, by the separate insert.

A more particular object of the invention is to provide a unitary tape guide insert of the character described which can readily be integrally fabricated of a synthetic plastic material by the use of injecting molding techniques and which provides, in and of itself, the resilient surface areas along which the tape is guided and against which the recording equipment transducer heads and drive capstan operate during use of the cartridge for recording or playback.

Another object of the invention is to provide a novel and improved tape support and guide insert of the above nature which is devoid of all moving parts and the slide surfaces of which and over which the tape is driven are self lubricating to insure smooth, dependable and long-wearing operation of the cartridge in the recording and playback of sound.

Still other objects of the invention are to provide and endless loop magnetic cartridge with removable tape guide insert which will be simple in construction, easy to assemble, inexpensive to manufacture and long-wearing in use.

Other objects, features and advantages of the invention will be apparent from the following description when read with reference to the accompanying drawings. In the drawings, wherein like reference numerals denote corresponding parts throughout the several views.

Figure 1:
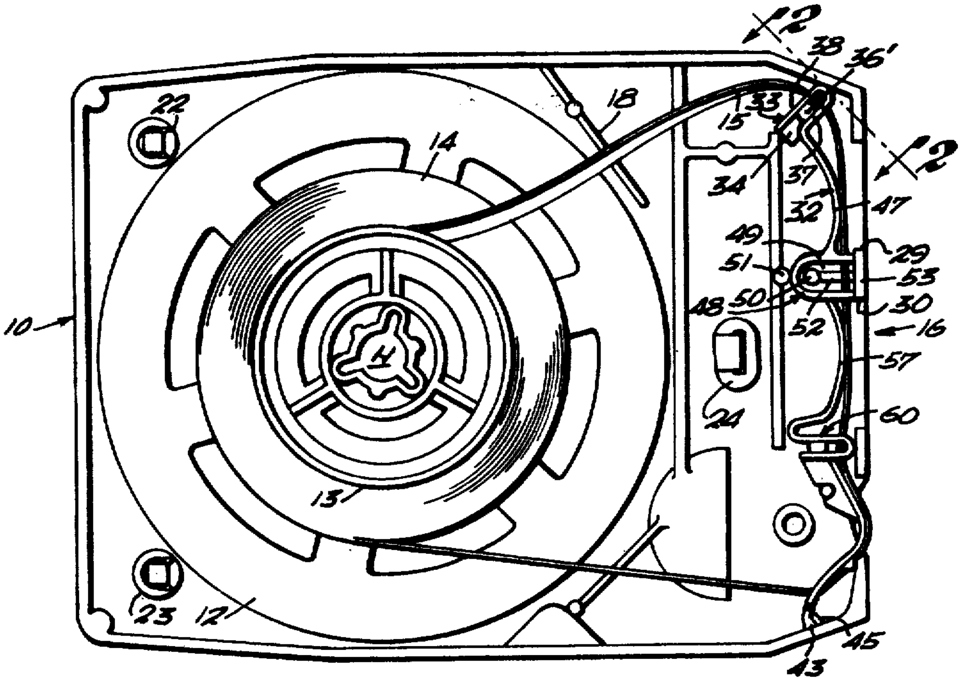
FIG. 1 is a plan view of the bottom shell portion of the cartridge case embodying the invention as seen from the open side and with the tape reel and removable tape guide insert in place.

Referring now in detail to the drawings, reference numeral 10 designates, generally, the bottom shell portion of an endless loop magnetic tape cartridge within which is received for rotation about a spindle 11, a one-sided tape reel 12 having a coaxial drum 13 about which is wound an endless magnetic tape 14 having an open loop portion 15 extending between the inner and outer ends of the winding for transport behind the apertured end face 16 of the cartridge housing during recording and playback in the manner hereinbelow more particularly described. Since the basic constructional details of the two-part molded construction of the cartridge case comprising the bottom shell member 10 of FIG. 1 and the top or cover shell portion are well known in the industry, only such details thereof as are required for a full understanding of the present invention will be described in detail herein. Suffice it to say that the bottom and top shell portions comprising the tape cartridge are integrally molded with interiorly projecting slide abutment member 18 in said bottom shell portion and cooperative guide wall portions in the cover shell portion (not illustrated) defining a channel for through passage of the magnetic tape, and that the open loop 15 is directed to pass flatwise along the inside of the cartridge end face 16. Releasable lock means comprising integrally formed hook posts 22, 23, 24 within the bottom shell portion 10, engageable with catch members in the cover shell portion (not illustrated), moreover, enable ready interlocking assembly of the tape cartridge simply by snapping together while being held in proper relatively adjusted position.

Figure 2:
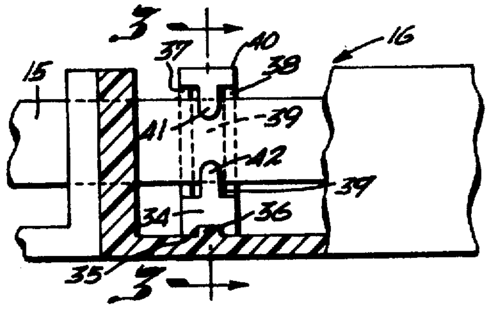
FIG. 2 is a vertical cross-sectional view taken along the line 2—2 of FIG. 1 in the direction of the arrows.
Figure 4:
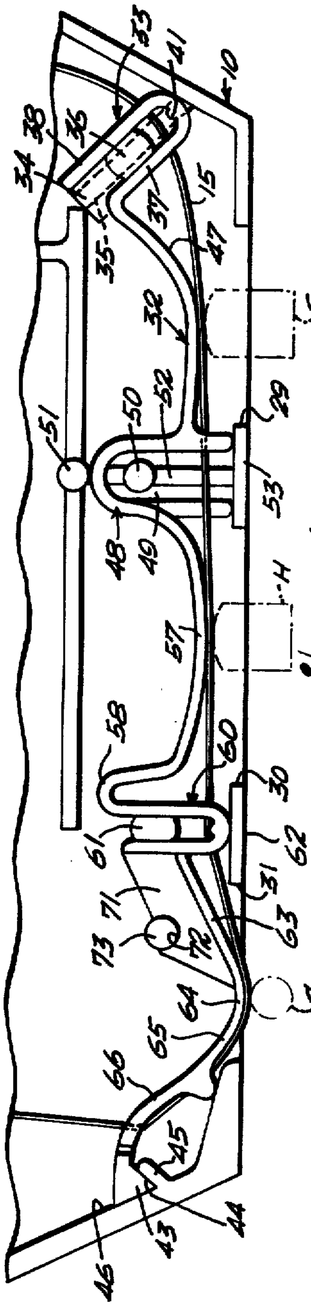
FIG. 4 is a partial inside plan view, as in FIG. 1, of the tape face end of the bottom shell portion of the cartridge case drawn in an enlarged scale to illustrate mechanical details, the tape guide insert and tape being assembled thereto in operative position.

As best illustrated in FIGS. 2 and 4, the end face of the cartridge 16 is provided with openings 29 and 30 for the penetration of the switching device S and the transducer head H, respectively, of the recording and/or playback equipment with which the cartridge is used, and opening 31 for application of the rotative capstan C of the equipment by means of which the magnetic tape is transportated at the underside of said end face. The present invention resides in the provision of a novel tape guide insert, designated generally by reference numeral 32, removably insertable within the cartridge bottom shell portion 10 during assembly of the cartridge, by means of which the open loop 15 of the magnetic tape is resiliently supported from behind for cooperative engagement with the pick-up or recording heads or transducers and the drive capstan of the recording and/or playback equipment with which the cartridge is used. Since such recording and/or playback equipment is commonly known and understood, further description herein is deemed unnecessary for a full understanding of the present invention.

Figure 3:
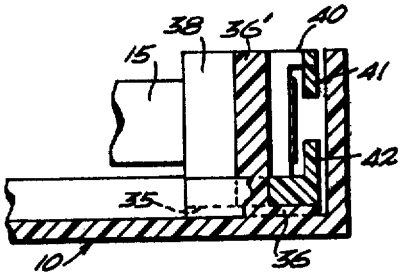
FIG. 3 is a vertical cross-sectional view taken along the line 3—3 of FIG. 2 in the direction of the arrows.
Figure 5:
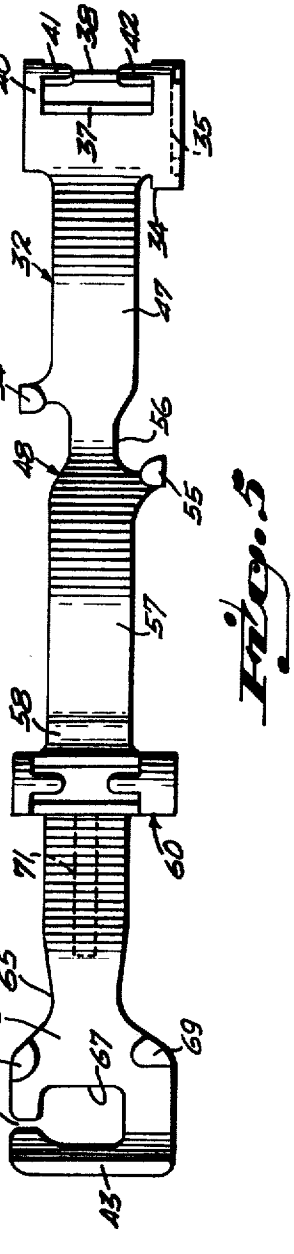
FIG. 5 is a top plan view of the tape guide insert shown separately and on an enlarged scale.

As best illustrated in FIGS. 4 and 5, the tape guide insert 32 is of a generally elongated configuration, and is integrally molded of a tough, resilient, synthetic plastic material such as nylon. At its leading or right-hand end as illustrated in FIGS. 4 and 5, and as detailed in FIGS. 2 and 3, the insert 32 is formed with an attachment end portion 33 having a base 34 longitudinally grooved at the underside as indicated at 35 for the interlocking reception of a complementary locating boss 36 molded within the bottom shell portion 10 of the cartridge. Integrally formed with the base 34 is an upstanding support portion 36' outwardly of each side of which extend spaced, parallel side wall portions 37, 38 defining therebetween an opening 39. The upper ends of the parallel side wall portions 37, 38 are bridged by a top wall portion 40 which extends laterally outwardly of said parallel side wall portions 37, 38 and which terminates in a central, inwardly directed projection 41, rounded at its outer end. The base portion 34 is similarly provided with an inwardly directed projection 42 in aligned registration with the projection 41 and defining therebetween an opening for the insertion of the magnetic tape loop 15. As best illustrated in FIGS. 2 and 3, the tape 15 slides along the slightly rounded upper edges of the parallel side wall portions 37, 38 and is abuttingly constrained against separation from the insert 32 at its leading end by virtue of the projections 41, 42.

At the opposite or left-hand end of the tape guide insert 32 as illustrated in FIGS. 4 and 5 there is provided a transversely extending, outwardly-projecting hook portion 43, angular in cross section, which serves to hookingly interengage with a cooperative angular recess 44 within the bottom shell portion 10 of the cartridge. The recess 44 is provided by integrally molding within the bottom shell portion 10 of the tape cartridge, an angular projection 45 extending outwardly of the interior side wall portion 46 near the end face of said bottom shell portion.

As best illustrated in FIGS. 1, 4 and 5, the tape guide insert 32 is not only provided with means including the attachment end portion 33 and hook portion 43 at each end for removably retaining it in place within the bottom shell portion 10 of the cartridge, but is also provided with guide and retainer means for the transport of the open loop portion 15 of magnetic tape as it is driven by the capstan C (see FIG. 4) of the recording and/or playback equipment. To these ends, the insert 32, beginning at the attachment end portion 33 (the right-hand end as seen in FIGS. 1, 4 and 5) is provided, just beyond said attachment portion, with an upwardly-curved first pressure surface portion 47 the upper surface of which, when the insert is fitted in place within the bottom shell portion 10 of a magnetic tape cartridge, lies in a plane substantially parallel with the end face 16 of the cartridge. The first pressure-surface portion 47 of the guide insert 32 merges into and is integrally formed with a generally U-shaped portion 48 providing a recess 49 the upper or open end of which surrounds an upstanding post 50 integrally formed within the bottom shell portion 10 of the cartridge. Also formed within the bottom shell portion 10 of the cartridge is a back post 51 defining, together with upstanding post 50, a recess for the reception of the insert U-shaped portion 48, and a relatively short, upstanding rib 52 between said posts which serves as an abutment for the lower edge of said U-shaped portion. The rib 52 extends outwardly beyond the upstanding post 50 and serves not only to strengthen said upstanding post but also to buttress the front wall portion 53 of the cartridge end face between the apertures or openings 29 and 30.

As illustrated in FIGS. 1, 4 and 5, U-shaped portion 48 comprises longitudinally offset upper and lower abutment leg portions 54, 55, respectively, the outer ends of which normally contact inner surface portions of the front wall portion 53 comprising the end face 16 of the cartridge. It is also to be noted that inserted tape loop 15 passes between the upstanding upper and lower abutment leg portions 54, 55, whereby the tape is constrained against lateral movement as it moves along the upper surfaces of the insert 32, as is hereinbelow more particularly described. It is also to be noted that, with reference to FIG. 5, that the arcuate end of the U-shaped portion 48 is of symmetrically reduced width between the abutment leg portions 54, 55 thereof as indicated at 56 to provide a zone of increased resiliance hereat for the purpose hereinafter appearing.

The U-shaped portion 48 of the insert 32 extends into an upwardly curved, second pressure surface portion 57, a major portion of which lies substantially in the same parallel plane as that of the first pressure surface portion 47. The outer end of the upwardly curved pressure-surface portion 57 extends, through a reversely bent portion 58, into a generally U-shaped tape retainer portion 60 of substantially the same configuration as that of the support portion 36 at the leading end of the insert 32, but lacking the grooved base portion 34 of said attachment end portion.

The tape retainer portion 60 fits over and interengages with an upstanding post member 61 integrally formed within the bottom shell portion 10 of the cartridge. The fit is such that the curved outer end of tape retainer portion 60 abuts the underside of the front wall portion 62 of the cartridge end face between the apertures or openings 30 and 31. The outside of the U-shaped tape rettainer portion 60 extends through a retainer flat portion 63 into an arcuate portion 64 which merges into a reduced width portion 65 extending into a reversely bent terminal portion 66, the outer end of which is formed with the outwardly projecting hook portion 43. The reversely bent terminal portion 66 of the insert 32 is provided with a rectangular opening 67 of such width as to pass the magnetic tape flat-wise therethrough, as illustrated in FIGS. 4 and 5, said rectangular opening having an entrance slot 68 at its upper side (as illustrated in FIG. 4) to enable manual insertion or threading of the magnetic tape open loop 15.

The reversely bent terminal portion 66 is further formed, at each side and rearwardly of the rectangular opening 67, with opposed, outwardly-projecting abutment portions 69,70 defining a slot therebetween for passage of the tape, and which abut inner wall portions of the front face of the cartridge assembly, as best illustrated in FIG. 4.

The underside of the relatively flat portion 63 of the insert 32 is integrally formed with a central, longitudinally-extending stiffening portion 71, the outer edge of which is formed near its forward end, with an arcuate recess 72 for inter-fitting engagement with a cylindrical upstanding post 73 integrally formed within the bottom shell portion 10 within the cartridge. It will thus be understood that the rib reinforced portion 63 of the insert 32 will be relatively stiff as compared with the reduced width portion 65 thereof, so that the backing afforded the capstan C through the tape loop 15 will undulate at the frictional abutment zone therebetween to insure positive transport without back slippage of the tape as it is being driven by the associated playback and/or recording equipment.

While I have illustrated and described herein only one form in which my invention can conveniently be embodied in practice, it is to be understood that this form is presented by way of example only and not in a limiting sense. The invention, in brief, comprises all the embodiments and modifications coming within the scope and spirit of the following claims.

What I claim as new and desire to secure by Letters Patent is:

1. A tape guide insert for endless loop magnetic tape cartridges of the type comprising a cartridge case having a pair of relatively separable half shell portions defining an interior tape reel chamber and an elongated end face having a plurality of aligned, longitudinally-spaced through openings for the insertion, from the outside, of respective sensing switch, transducer and drive capstan members of associated recording and/or playback equipment, and further comprising a spindle for the removable assembly of a tape spool containing an endless winding of magnetic tape having an open loop adapted to be continuously guided across the inside of the cartridge end face for cooperative engagement with the sensing switch, transducer and drive capstan members upon application of the magnetic tape cartridge to the associated equipment for recording or playback, the improvement comprising an elongated tape guide member, said tape guide member having support means for guidingly constraining the open loop of the magnetic tape to flat-wise movement along one side of said guide member, and means for removably securing said tape guide member within one of said pair of half shell portions of the cartridge prior to the assembly of the other half shell portion thereto so that the open loop of the magnetic tape, when guidingly constrained by said tape guide member, is disposed for translatory guidance along the inside of the cartridge end face for continuous cooperative engagement by the sensing switch, transducer and drive capstan members of the associated equipment when the cartridge is applied thereto for playback or recording of the magnetic tape, said means for guidingly constraining the open loop of the magnetic tape comprising transversely-extending openings at each end of said tape guide member of sufficient width to permit the magnetic tape to pass flat-wise therethrough and along said one side of said guide member, while at the same time constraining it against relative lateral movement with respect thereto.

2. A tape guide insert as defined in claim 1 including means for relatively fixing other intermediate portions of said tape guide member with respect to said one of said pair of half shell portions of the cartridge at zones behind the end face of the cartridge separating the through openings therein, whereby said first mentioned intermediate portions along said guide member are supported for independent flexure with respect to the pertaining one of the sensing switch, transducer and drive capstan members of the associated equipment when the cartridge is applied thereto for playback or recording of the magnetic tape.

3. A tape guide insert as defined in claim 1 wherein said tape guide member is formed of a tough, resilient synthetic plastic material having a low coefficient of friction.

4. A tape guide insert as defined in claim 3 wherein said means for guidingly constraining the open loop of magnetic tape further comprises a transversely-extending opening in one of said other intermediate portions of said tape guide member, of sufficient width to permit the magnetic tape to pass flat-wise therethrough.

* * * * *